(12) United States Patent
Moffatt et al.

(10) Patent No.: US 6,468,340 B1
(45) Date of Patent: Oct. 22, 2002

(54) LAKED DYE SOLUBILIZATION WITH COMPLEXING AGENT

(75) Inventors: John R Moffatt, Corvallis, OR (US); Joseph W Tsang, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/702,145

(22) Filed: Oct. 30, 2000

(51) Int. Cl.$^7$ .................................................. C09C 3/08
(52) U.S. Cl. ....................... 106/402; 106/31.6; 106/499; 106/505
(58) Field of Search .............................. 106/402, 31.6, 106/499, 505; 347/100

(56) References Cited

U.S. PATENT DOCUMENTS

| | | | | |
|---|---|---|---|---|
| 4,597,794 A | | 7/1986 | Ohta et al. ..................... 106/20 |
| 4,711,674 A | * | 12/1987 | Ando et al. ................... 106/289 |
| 4,861,379 A | * | 8/1989 | Imai et al. .................... 106/402 |
| 5,750,592 A | | 5/1998 | Shinozuka et al. ........... 523/161 |
| 5,800,601 A | * | 9/1998 | Zou et al. ................. 106/31.65 |
| 5,913,971 A | | 6/1999 | Fujimatsu et al. ........ 106/31.86 |
| 5,958,999 A | | 9/1999 | Bates et al. .................. 523/161 |
| 5,969,002 A | | 10/1999 | Kijlstra et al. ............... 523/160 |
| 6,294,013 B1 | * | 9/2001 | Ortlano et al. ............... 106/402 |

FOREIGN PATENT DOCUMENTS

| | | | |
|---|---|---|---|
| EP | 0518225 | 12/1992 | ........... C09D/11/00 |
| EP | 0556649 | 8/1993 | ........... C09D/11/00 |
| JP | 62-28283 | * 2/1987 | |

* cited by examiner

*Primary Examiner*—Anthony J. Green

(57) ABSTRACT

An inkjet ink composition having good stability which is an aqueous dispersion and/or solution of large particles of water soluble pigments derived from laked dyes, the water solubilizing groups on the surface of the laked dyes being exposed by removing surface counter-cations with chelating agents.

15 Claims, No Drawings

LAKED DYE SOLUBILIZATION WITH COMPLEXING AGENT

FIELD OF THE INVENTION

The present invention relates to an ink composition used in inkjet printing, and, more specifically, to enabling solubilization of laked dye pigments in water by a chelating process.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium.

Inks normally used in ink-jet recording are commonly composed of water-soluble organic solvents (humectants, etc.), surfactants, and colorants in a predominantly aqueous fluid. When printed on "plain paper", the colorants retain some mobility, which can be manifest in poor bleed, edge acuity, feathering, and inferior optical density/chroma (due to penetration of the paper). These features adversely impact text and image quality.

The evaporation rate of water-based inks is slow and smearing of the printed image can occur. The use of pigments can improve ink jet printing attributes such as drytime, waterfastness, smearfastness, chroma and optical density. However, pigments by themselves are not soluble in aqueous thermal ink jet (TIJ) vehicles. A dispersant is conventionally used to render the pigment water-soluble. This conventional stabilization of the dispersion has disadvantages because unless properly designed the dispersion is unstable to time and temperature fluctuations.

U.S. Pat. No. 4,597,794 discloses stabilizing the pigments in the printing inks with polymeric dispersants constructed of ionically hydrophilic and aromatically hydrophobic segments.

EP-A 518 225 and EP-A556 649 describe acrylic block copolymers of the type AB, BAB and ABC for use as dispersants for pigments in printing inks.

U.S. Pat. Nos. 5,750,592 and 5,913,971 both disclose dispersing a pigment for a water-based inkjet ink with a water-soluble resin, Similarly, U.S. Pat. No. 5,969,002 discloses an inkjet ink in which a pigment is dispersed in a water-based inkjet ink with a water-soluble polyisocyanate addition product.

As a further example, U.S. Pat. No. 5,958,999 discloses an ink for use in inkjet printing in which a pigment is combined with a polyvinylimidazole, a polyvinylpyridine or a polyethyleneimine to form aqueous dispersions.

All of the above means to achieve the dispersion of pigment in water for inkjet ink printing tend to be expensive. Furthermore, they introduce other complications into the inkjet ink.

For example, pigments as conventionally used in paints have excellent water resistance and lightfastness. However, when pigments, in an aqueous vehicle together with the dispersing agent, are inkjetted onto a medium, the water resistance and colorfastness of the pigment is noticeably decreased. Thus, in making a pigment dispersible for use in inkjet printing ink, the pigment's most positive qualities are diminished.

A way is needed to achieve inkjettability of pigments by solubilizing the pigment in the aqueous inkjet ink vehicle. It would be particularly advantageous if this could be achieved without resorting to organic dispersing agents which significantly diminish the waterfastness and lightfastness of the pigment on the media, which in turn decreases the overall print quality and chroma.

SUMMARY OF THE INVENTION

The present invention relates to a method of increasing solubility of a laked dye pigment in an aqueous vehicle, comprising the steps of:
  a) adding a sufficient amount of chelating agent to the aqueous vehicle to chelate and remove precipitating cations bound to surface anionic solubilizing groups from the laked dye pigment; and
  b) removing chelating agent from the aqueous vehicle.

The present invention also relates to a laked dye pigment at least partially soluble in a aqueous vehicle produced by the method comprising the steps of:
  a) adding a sufficient amount of chelating agent to the aqueous vehicle to chelate and remove precipitating cations bound to surface anionic solubilizing groups from the laked dye pigment; and
  b) removing chelating agent from the aqueous vehicle.

The present invention additionally relates to an ink-jet printing apparatus, comprising:
  at least one printhead portion including an ink composition comprising
  at least one pigment particle complex;
  at least one chelating agent; and
  an aqueous solvent;
  wherein the at least one pigment particle complex is made by the method comprising the steps of:
    a) adding a sufficient amount of chelating agent to the aqueous vehicle to chelate and remove precipitating cations bound to surface anionic solubilizing groups from the laked dye pigment; and
    b) removing chelating agent from the aqueous vehicle.

The present invention also relates to a water soluble laked dye pigment having a zeta potential in the range from 5 to 5000 mVolts.

The present invention also relates to a water soluble laked dye pigment having a particle size in the range from 0.005 to 12 microns.

DETAILED DESCRIPTION OF THE INVENTION

The present invention described herein is directed to ink-jet inks for printing ink-jet images using commercially available ink-jet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8½"×11", 20 lb. weight, printer paper conventionally used for office and home computers.

In particular, the present invention relates to laked dye pigments such as calcium, magnesium, aluminium lakes of sulpho-and/or carboxyl-containing dyes. As with other pigments such as organic pigments (azo, disazo, polyazo, anthraquinone, thioindigo series; phthalocyanine, quinacridone, dioxazine, isoindolinone, naphthalenetetracarboxylic acid and perylene and perylenetetracarboxylic acid series; perinone, indigoid, thioindigoid, diketopyrrolopyrrole series; and metal complex pigments of azo azomethine or methine dyes), laked dyes are not readily dispersible in aqueous solvent. Organic solvent dispersants are needed to use these pigments in inkjet printing inks.

As discussed above in the background section, the use of organic dispersants with pigments, including the laked dye pigments, has the effect of decreasing water resistance and lightfastness in media images inkjet-printed with pigment-containing inks.

The present inventors have discovered how to make the laked dye pigments soluble in the aqueous vehicle used in inkjet ink. This alleviates the necessity of using organic dispersants in the inks. Thus, water resistance and lightfastness are improved on media images inkjet printed with such laked dye pigment-containing inks.

In summary, the present invention relates to a method of increasing solubility of a laked dye pigment in an aqueous vehicle, comprising the steps of:

a) adding a sufficient amount of chelating agent to the aqueous vehicle to chelate and remove precipitating cations bound to surface anionic solubilizing groups from the laked dye pigment; and b) removing chelating agent from the aqueous vehicle.

In the method of making the above-described water-soluble laked dye pigment, the chelating agent may be removed from the aqueous vehicle using semi-permeable membranes by a method such as microfiltration (which may be ultrafiltration), reverse osmosis and dialysis. Membrane processes for purification of pigments (specifically, macromolecular chromophores) are described in U.S. Pat. No. 5,985,016, by the same inventors and assigned to the present applicant. This patent is incorporated herein by reference.

As discussed above, without the above-described treatment with chelating agent, pigments consisting of laked dyes are insoluble in water. This is because the laking process renders a water-soluble dye as a pigment by introducing a reactant, which precipitates the dye thus creating the pigment. The pigment itself is insoluble for two reasons. One is the size of the pigment, which can reach several hundred nm in diameter, and the other is the lack of solubilizing groups on the pigment particle. Thus, the surface of the laked dye pigment is potentially laced with solubilizing groups, such as in a non-limiting example, sulfonate groups. Removing some of this precipitating reagent from the pigment surface should result in partial solubilization of the pigment particle. For example, Pigment Red 53:1, Pigment Red 53:2 are acid dyes, laked with Ba and Ca ions, respectively. Besides barium and calcium, the precipitating reagent can also be barium, calcium, aluminum, strontium, zinc, titanium and other polyvalent metal cations. Removing the surface cations, which are coordinated to the sulfonate groups on the pigment surface, should render the pigment particle water-soluble. Care must be exercised in removing these precipitating reactants so that the precipitating reagent is not removed from the inner region of the pigment particles. This would result in the destruction of the pigment and solubilization of the dye.

Thus, EDTA (ethylenediaminetetraacetic acid, disodium or tetrasodium salt) (or other chelate as described below) at the right pH can remove Ca and Ba ions at the pigments surface and render the pigment particle water-soluble or self-dispersing, without solubilizing all the dye molecules in the pigment particle. The resulting dispersion has lightfastness, waterfastness and high print quality with good chroma. It also has excellent stability characteristics.

Other chelating agents that can be used in this invention are: ethylenediaminetetracetic acid, ethylenediaminetetracetate disodium salt, ethylene diaminetetracetate tetrasodium salt, alginate, acetyl acetonate and maleic anhydride, diethylenetetraminepentaacetic acid (DTPA), trans-1,2-diaminocyclohexanetetraacetic acid (CDTA), (ethylenedioxy) diethylene dinitrilotetraacetic acid (EGTA), malonic acid, and/or salicylic acid.

The present invention also relates to the water soluble laked dye pigment derived form the process of solubilizing laked dyes (via the chelation process previously described).

It has also been found that the laked dye pigment of the present invention, having solubility in aqueous inkjet ink vehicle, has a zeta potential in the range from 5 to 5000 mVolts. In a preferred embodiment, the water soluble laked dye pigment has a zeta potential in the range from 300 to 1200 mVolts.

In another preferred embodiment the water soluble laked dye pigment has a particle size in the range from 0.005 to 12 microns.

The present invention also relates to an ink-jet printing apparatus comprising at least one printhead portion including an ink composition comprising the water soluble laked dye pigment of the present invention.

Self-Dispersed Laked Dye Pigments

The inks made according to the present invention comprise at least one colorant, preferably at least one self-dispersed laked dye pigment. Examples of such pigments include: Pigment Red 172; Pigment Blue 24; Pigment Blue 63; Pigment Red 49; Pigment Red 50; Pigment Red 53; Pigment Red 68; Pigment Red 17; Pigment Orange 46; Pigment Red 48; Pigment Red 52; Pigment Red 58; Pigment Red 63; Pigment Red 64; Pigment Red 200; Pigment Red 151; Pigment Red 237; Pigment Red 239; Pigment Red 243; Pigment Red 247; Pigment Yellow 104; Pigment Orange 19; Pigment Red 60; Pigment Red 66; Pigment Red 67; and Pigment Yellow 100.

Surfactants

Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO). These surfactants provide the necessary dot spread on plain paper and special media, such as photobase glossy paper, for providing excellent image quality.

Other Ingredients

The inks of the present invention may optionally comprise components such as buffers and biocides, as are well known in the art of ink-jet ink formulation.

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 4 to about 6 and most preferably from about 4 to about 5. Examples of preferably-employed buffers include succinic acid, tris(hydroxymethyl)aminomethane, available from companies such as Aldrich Chemical (Milwaukee, Wis.), 4-morpholineethanesulfonic acid (MES), and 4-morpholinepropanesulfonic acid (MOPS). Most preferably, succinic acid is employed in the practice of the invention.

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred. Any of the biocides commonly employed in ink-jet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

All concentrations herein are in weight percent of total ink composition, unless otherwise indicated. The purity of all components is that employed in normal commercial practice for ink-jet inks.

EXAMPLES

Example 1

Pigment Red 53:1, (1-azo-(4-chloro-5-methyl-2-sulfanatophenyl)-2-naphthol) was treated with EDTA to produce pigment particle dispersed in an aqueous solution in the form of large particles (measured at between 600 and 700 nm by Quasi-elastic light scattering (QELS). The particles were subjected to reverse osmosis until the conductivity of the water-soluble pigment complex showed no further decrease in value and remained constant. At that point it was assumed that the EDTA had been completely removed from the water-soluble pigment solution.. The pigment particles in the aqueous solution remained stable at ambient temperature for at least two weeks and no change in particle size was observed by QELS.

Example 2

Pigment Red 53:1, was subjected to alginate dialysis treatment to produce pigment particle dispersed in an aqueous solution in the form of large particles (measured at between 600 and 700 nm by Quasielastic light scattering (QELS)). The particles were dialyzed until the conductivity of the water-soluble pigment complex showed no further decrease in value and remained constant. At that point it was assumed that the alginate had been completely removed from the water-soluble pigment solution all the alginate was completely removed from the water-soluble pigment. The pigment particles in the aqueous solution are stable at ambient temperature for at least two weeks with no change in particle size observed by QELS.

While the foregoing invention has been described in some detail for purposes of clarity and understanding, it will be clear to one skilled in the art from the reading of this disclosure that various changes in form and detail can be made without departing from the true scope of the invention.

What is claimed is:

1. A method of increasing solubility of a laked dye pigment in an aqueous vehicle, comprising the steps of:
   a) adding a sufficient amount of at least one chelating agent to the aqueous vehicle to chelate and remove precipitating cations bound to surface anionic solubilizing groups from the laked dye pigment; and
   b) removing chelating agent from the aqueous vehicle.

2. The method according to claim 1, wherein the at least one chelating agent is selected from the group consisting of ethylenediaminetetracetic acid, ethylenediaminetetracetate disodium salt, ethylene diaminetetracetate tetrasodium salt, alginate, acetyl acetonate and maleic anhydride, diethylenetetraminepentaacetic acid (PTPA), trans-1,2-diaminocyclohexanetetraacetic acid (CDTA), (ethylenedioxy) diethylene dinitrilotetraacetic acid (EGTA), malonic acid, and salicylic acid.

3. The method according to claim 1, wherein the anionic solubilizing groups are sulfonate groups.

4. The method according to claim 1, wherein the precipitating cations are selected from the group consisting of barium, calcium, aluminum, strontium, zinc, titanium, and and other polyvalent metal cations.

5. The method according to claim 1, wherein the chelating agent is removed from the aqueous vehicle using semipermeable membranes by a method selected from the group consisting of microfiltration, reverse osmosis and dialysis.

6. A self-dispersing, laked dye pigment, which is water soluble without organic dispersants, produced by the method comprising the steps of:
   a) adding a sufficient amount of chelating agent in an aqueous vehicle to chelate and remove precipitating cations bound to surface anionic solubilizing groups from the laked dye pigment; and
   b) removing chelating agent from the aqueous vehicle.

7. The pigment according to claim 6, wherein at least one chelating agent is selected from the group consisting of ethylenediaminetetracetic acid, ethylenediaminetetracetate disodium salt, ethylene diaminetetracetate tetrasodium salt, alginate, acetyl acetonate and maleic anhydride, diethylenetetraminepentaacetic acid (DTPA), trans-1,2-diaminocyclohexanetetraacetic acid (CDTA), (ethylenedioxy) diethylene dinitrilotetraacetic acid (EGTA), malonic acid, and salicylic acid.

8. The pigment according to claim 6, wherein the anionic solubilizing groups are sulfonate groups.

9. The pigment according to claim 6, wherein the precipitating cations are selected from the group consisting of barium, calcium, aluminum, strontium, zinc, titanium, and other polyvalent metal cations.

10. The pigment according to claim 6, wherein the chelating agent is removed from the aqueous vehicle using semipermeable membrane by a method selected from the group consisting of microfiltration, reverse osmosis and dialysis.

11. An ink-jet printing apparatus, comprising:
    at least one printhead portion including an ink composition comprising
    at least one pigment particle complex;
    at least one chelating agent; and
    an aqueous solvent;
    wherein the at least one pigment particle complex is made by the method comprising the steps of:
    a) adding a sufficient amount of chelating agent to an aqueous vehicle to chelate and remove precipitating cations bound to surface anionic solubilizing groups from the laked dye pigment; and b) removing chelating agent from the aqueous vehicle.

12. The inkjet printing apparatus according to claim 8, wherein at least one chelating agent is selected from the group consisting of ethylenediaminetetracetic acid, ethylenediaminetetracetate disodium salt, ethylene diaminetetracetate tetrasodium salt, alginate, acetyl acetonate and maleic anhydride, diethylenetetraminepentaacetic acid (PTPA), trans-1,2-diaminocyclohexanetetraacetic acid (CDTA), (ethylenedioxy) diethylene dinitrilotetraacetic acid (EGTA), malonic acid, and salicylic acid.

13. The inkjet printing apparatus according to claim 11, wherein the anionic solubilizing groups are sulfonate groups.

14. The inkjet printing apparatus according to claim 11, wherein the precipitating cations are selected from the group consisting of barium, calcium, aluminum, strontium, zinc and titanium.

15. The inkjet printing apparatus according to claim 11, wherein the chelating agent is removed from the aqueous vehicle by a method selected from the group consisting of reverse osmosis and dialysis.

* * * * *